C. L. HOUSE.
TRUCK BODY.
APPLICATION FILED JUNE 25, 1920.

1,418,929.

Patented June 6, 1922.
2 SHEETS—SHEET 1.

INVENTOR.
C. L. House.
BY Victor J. Evans
ATTORNEY.

C. L. HOUSE.
TRUCK BODY.
APPLICATION FILED JUNE 25, 1920.
1,418,929.
Patented June 6, 1922.
2 SHEETS—SHEET 2.
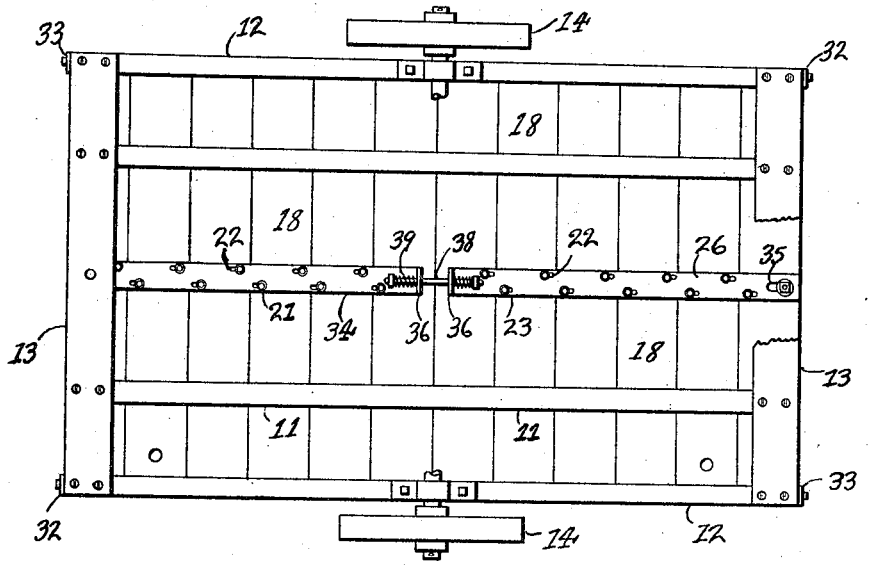
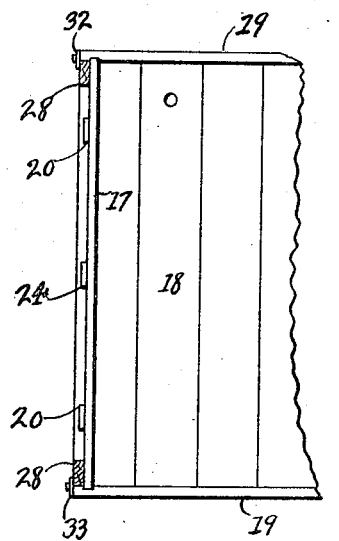
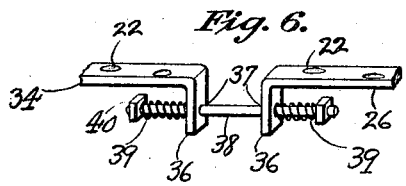
INVENTOR.
C. L. House.
BY Victor J. Evans
ATTORNEY.

UNITED STATES PATENT OFFICE.

CHARLES L. HOUSE, OF SAN FRANCISCO, CALIFORNIA.

TRUCK BODY.

1,418,929.     Specification of Letters Patent.     Patented June 6, 1922.

Application filed June 25, 1920. Serial No. 391,602.

*To all whom it may concern:*

Be it known that I, CHARLES L. HOUSE, a citizen of the United States, residing at San Francisco, in the county of San Francisco and State of California, have invented new and useful Improvements in Truck Bodies, of which the following is a specification.

This invention relates to improvements in truck bodies and has particular reference to a body used as a butter vat, which is mounted on a truck for the purpse of carrying material from one place to another.

The primary object of this invention is to provide means to allow for the expansion of the planks which compose the truck body.

Another object of this invention is to provide a body which when mounted on a truck, saves the running gear and at the same time is rigid enough to withstand strains on the running gear.

A further object of this invention is to provide a truck of the above mentioned character which is simple in construction, inexpensive to manufacture, easily assembled and disassembled, strong, durable and highly efficient.

Other objects and advantages of the invention will be apparent during the course of the following description:

Great inconvenience and annoyance have been experienced in the use of truck bodies heretofore because of the warping of the boards comprising the bottom of the body, the labor and time necessarily spent in cleaning the bottom of the body because of the material entering the cracks between the planks of the same, and the short life of the body with the consequent expense in constructing additional bodies. My invention not only overcomes these objections by allowing the planks comprising the body construction to expand and thereby prevent a warping and distorting of the same, but also furnishes to the trade a truck body which by actual experience will last twelve months longer than the old type, and a body which by its construction affords a sanitary device in which there will be no rusting of metal and consequent discoloring of the butter.

Figure 1:
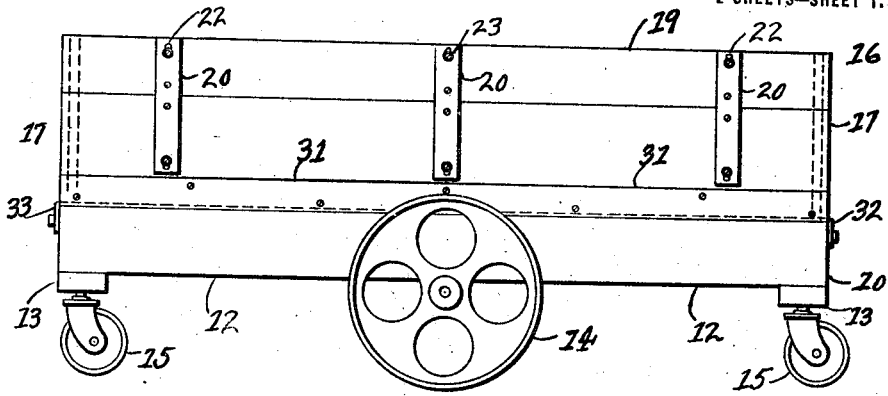
Figure 2:
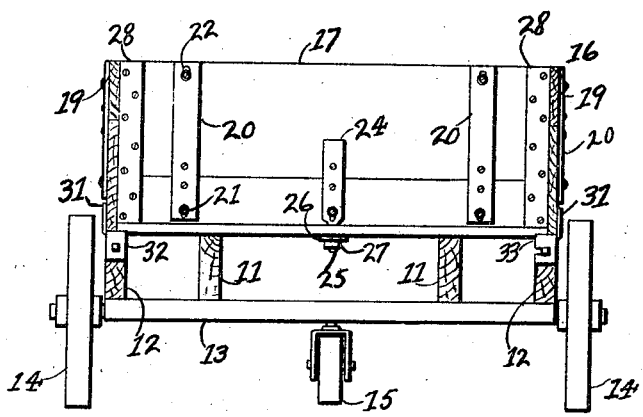
Figure 4:
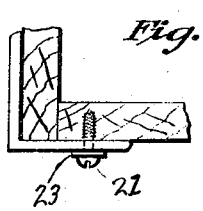
Figure 3:
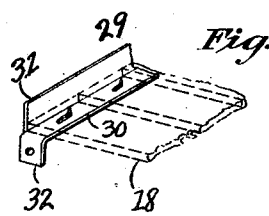

In the accompanying drawings forming a part of this specification and in which like numerals are employed to designate like parts throughout the same, Figure 1 is side elevation of a truck body mounted on a wheel frame, Figure 2 is an end elevation of the same, Figure 3 is a detail view of the angle iron forming a part of my invention, Figure 4 is an enlarged detail showing the position of a set screw in a plank of the body, Figure 5 is a bottom plan view of the body showing the binding clamps attached thereto, Figure 6 is a detail view in perspective of the binding clamps, and Figure 7 is a fragmentary top plan view of my device with part of the flooring of the body being broken away.

In the drawings wherein for the purpose of illustration is shown a preferred embodiment of my invention, the numeral 10 designates a truck frame as a whole of the standard type, comprising intermediate sills 11, side sills 12, and beams 13. For the purpose of moving the truck from place to place there are carried by the frame 10 large side wheels 14 and small ends wheels 15, as shown to advantage in Figures 1 and 2.

The numeral 16 designates the truck body as a whole, comprising preferably spaced horizontal strips or planks forming end walls 17, bottom planks forming a flooring 18, and horizontal planks forming side walls 19. These planks forming the respective side walls, end walls and flooring normally contact with each other and by their intimate association prevent the formation of crevices or openings. By referring to Figures 1, 2, 5 and 7, it will be apparent that by this construction there is set forth a smooth, unbroken interior which allows no room for material carried in the body to settle between the respective planks.

The numeral 20, as shown to advantage in Figures 1 and 2, designates metal clamps which hold together and in alignment the planks forming the end walls 17 and the side walls 19, and at the same time act as reinforcing means therefor. These clamps are attached to the end walls and side walls adjacent the respective edges thereof by screws 21. By referring to Figures 3 and 4, it will be observed that the clamps do not entirely penetrate the planks and accordingly leave the interior of the truck body free from metal which has heretofore caused a discoloring of the material placed in the body. Slots 22 are formed in the clamps, the purpose of which will be hereinafter described. Interposed between the slots and the heads of the screws 21 are washers 23. To assure a compact arrangement of the end walls 17 with the flooring 18, there are provided small metal clamps 24 (only one being shown), which terminate in extensions 25 entering the flooring 18 and which hold in close engagement with the bottom of the flooring 18 the end of a binding clamp 26. A nut 27 here forms the retaining means therefor.

The numeral 28 designates reinforcing bars, preferably made of wood. These bars are attached to end walls 17 by any suitable fastening means, preferably small screws, which are shown to advantage in Figures 1 and 2 in staggered arrangement.

Attention is called to the exterior mounting on the body of the respective metal clamps 20, and reinforcing member 28. It will be observed that by this construction, the interior of the body will be smooth, unbroken and free from internal obstructions.

It will be noted that the truck body in Figures 1 and 2, rests on the intermediate sills 11 and end sills 12. For the purpose of attaching the truck body securely to the frame 10, there are provided angle irons designated as a whole by the numeral 29. One of the angle irons is shown in detail in Figure 3, and includes a flat surface 30, a vertical side face 31, and depending lips 32 and 33, the lip 33 being shown to advantage in Figure 2. These angle irons tend to hold the body 16 securely on the frame 10, and it will be observed that by the provision of slots in the depending lips 33 that means are set forth for allowing the ready assembling and disassembling of the truck body. Reference to Figure 3 will disclose the manner in which a section of the flooring 18 is held by the angle iron, and reference to Figures 1 and 2 will disclose how the angle irons securely lock and rigidly hold the truck body 11 on the frame 10.

Means are provided to allow for the expansion of the flooring, the same comprising a pair of binding clamps which are designated by the numerals 26 and 34, the numeral 26 designating a right binding clamp and the numeral 34 a left binding clamp. These clamps are shown to advantage in Figures 5 and 6, each being provided with a series of staggered slots 22 throughout the length of the same and each having likewise formed thereon adjacent one end thereof an enlarged slot 35 (only one being shown) to accommodate the extension 25 of the small metal clamp 24. Each of the binding clamps also terminates at the opposite end to that on which the enlarged slots are formed in lips 36 formed at a right angle to the plane of the clamp. These lips are provided with openings 37 to receive a cross rod 38, which in turn is embraced by a pair of coiled springs 39, while nuts 40 are also mounted on the rods to act in conjunction with lips 36 to hold the springs in a normally contracted position on the rod.

It will be readily apparent from the above description that by attaching the binding clamps with the slots formed thereon to the bottom of the flooring with the associated tension means, I have set forth means which allow an expansion of the planks comprising the flooring when the same has been subjected to moisture or dampness. The formation of slots in the clamps holding the side walls and end walls will also allow for expansion to a limited degree when these parts become moistened or dampened. Furthermore, it will also be apparent that novel means have been set forth which will allow the ready assembling and disassembling of the truck body on the truck frame and means which will securely and rigidly hold the body on the frame.

While this device is primarily intended to be used as a butter vat, it is to be understood that it may be utilized for various other purposes and the principle disclosed in the invention is intended to cover all types of bodies and allows for the expansion of the same, which expansion is caused by the presence of moisture either in the material which is placed in the body, or is due to dampness in the atmosphere in places where the body is used.

It is to be understood that the form of my invention herewith shown and described, is to be taken as a preferred example of the same, and that various changes in the shape, size and arrangement of parts may be resorted to without departing from the spirit of the invention or the scope of the subjoined claim.

Having thus described my invention, I claim:—

The combination with a wheeled frame having a pair of end sills, of a truck body including side walls, end walls, and a flooring made of a plurality of board sections, means for attaching said body to the end sills of said frame, and means to allow for the expansion of the side walls, end walls, and flooring of said body, comprising slotted straps for the side and end walls each of a length to overlie two adjacent board sections, and pins on said board sections seated free to slide in the slots of said straps, the means serving to allow expansion of the flooring comprising a binding clamp fixed to the flooring transversely to the board sections thereof and made into parts with its confronting ends joined by a spring tension device, each one of the board sections of the flooring being separately attached to the binding clamp, and the attaching means therefore comprising pins on the said board sections with slots in the binding clamp in which said pins are seated and free to slide.

In testimony whereof I affix my signature.

CHARLES L. HOUSE.